July 13, 1965
L. FLEUCHAUS
3,195,135
APPARATUS FOR GUIDING VTOL AIRCRAFT TO A
RESTRICTED LANDING SURFACE
Filed April 27, 1961
5 Sheets-Sheet 5
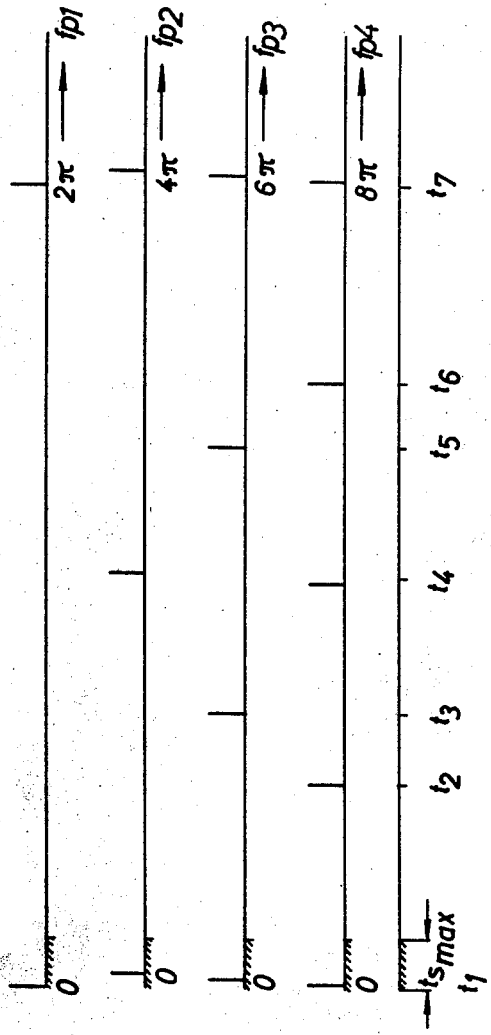
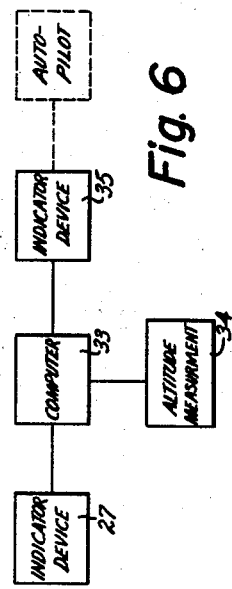
L. FLEUCHAUS
INVENTOR.
BY Moore, Hall & Peacock
ATTORNEYS.

United States Patent Office 3,195,135
Patented July 13, 1965

---

3,195,135
APPARATUS FOR GUIDING VTOL AIRCRAFT TO A RESTRICTED LANDING SURFACE
Leo Fleuchaus, Munich, Germany, assignor to Messerschmitt AG., Augsburg, Germany, a company of Germany
Filed Apr. 27, 1961, Ser. No. 105,982
Claims priority, application Germany, June 2, 1960, M 45,519
7 Claims. (Cl. 343—108)

This invention relates to a navigational system designed to guide VTOL-aircraft (vertical take off and landing), especially in instrument flight, along a directrix to a landing area of very limited size.

In contrast to the landing by asymptotic approach to a runway, as used in connection with conventional aviation, a VTOL-aircraft descends vertically in the final phase of its landing. It is therefore almost impossible to utilize known conventional navigational landing systems for the safe landing of a VTOL-aircraft, especially in case of instrument landing.

Navigational systems are known where, by appropriate arrangement of several antennas radiating electromagnetic waves, surfaces of equal transit time differences are represented by a family of spatial or three-dimensional hyperbola lobes. The three-dimensional curve of intersection of two conjugated hyperbola lobes serves as the criterion for navigation during the landing operation.

All known landing aids which are based on a hyperbola system generate a directrix to guide the aircraft asymptotically during its horizontal approach to the runway and they are therefore unsuitable as landing aids for VTOL-aircraft. It is therefore necessary, and an object of the present invention, to provide a navigational system for the landing of an VTOL-aircraft, arranged to guide it to a landing area of very limited size (approximately 50 m. x 50 m.), and to allow it to descend vertically to this area. Further requirements, and objects of the present invention, are to provide such a system wherein the approach is possible from any point of the compass, and wherein the course of the aircraft, especially during the final phase of an instrument landing, can be controlled precisely and accomplished by automatic means.

The invention effects the foregoing objects by a navigational system which makes it possible to guide a VTOL-aircraft along a directrix in instrument flight to an area of very limited size and to accomplish a vertical let-down. For this purpose four antennas are erected on the ground which radiate an electromagnetic wave of high frequency (UHF carrier) in such manner that each pair of opposed antennas produce, in reference to the modulation frequency of the UHF carrier, a family of double-sheet hyperbolic surfaces designated by the parameter of equal transit time differences. The antenna pairs are moreover correlated in such manner that the hyperbolic surfaces of equal transit time differences of two opposed antenna pairs will intersect, forming a multitude of three-dimensioned curves of intersection of equal transit time differences, which intersection curves pass substantially perpendicularly through the plane containing the landing surface, and represent the directrices. One of these directrices, running radially with respect to the landing area, is selected as the approach flight curve. With the aid of suitable means placed within the receiving apparatus of the aircraft, it thus becomes possible to guide and control the flight of the aircraft along the selected curve until it reaches the landing area.

For the purpose of accomplishing the necessary reduction of the kinetic energy of the VTOL-aircraft during the piloting along the selected flight path, known means are provided for effecting a precise altitude measurement.

According to the invention, a control signal is computed with the aid of an electronic computer, known per se, on the basis of altitude and transit time difference measurements which makes possible the manual or automatic piloting of the aircraft in accordance with the selected flight path while the operator of the aircraft, guided by an appropriate indicator mechanism, simultaneously effects appropriate reductions in the kinetic energy of the craft, e.g., by appropriately positioning landing flaps or changing the pitch of the aircraft.

One example of the arrangement proposed by the invention is illustrated in the accompanying drawings, wherein:

FIGURE 5 is a pulse graph demonstrating the synchronization of the dividers employed in the arrangement of FIGURE 4; and FIGURE 6 is a block diagram illustrating an overall arrangement for obtaining a control signal dependent upon both altitude and transit-time differences.

Figure 1:
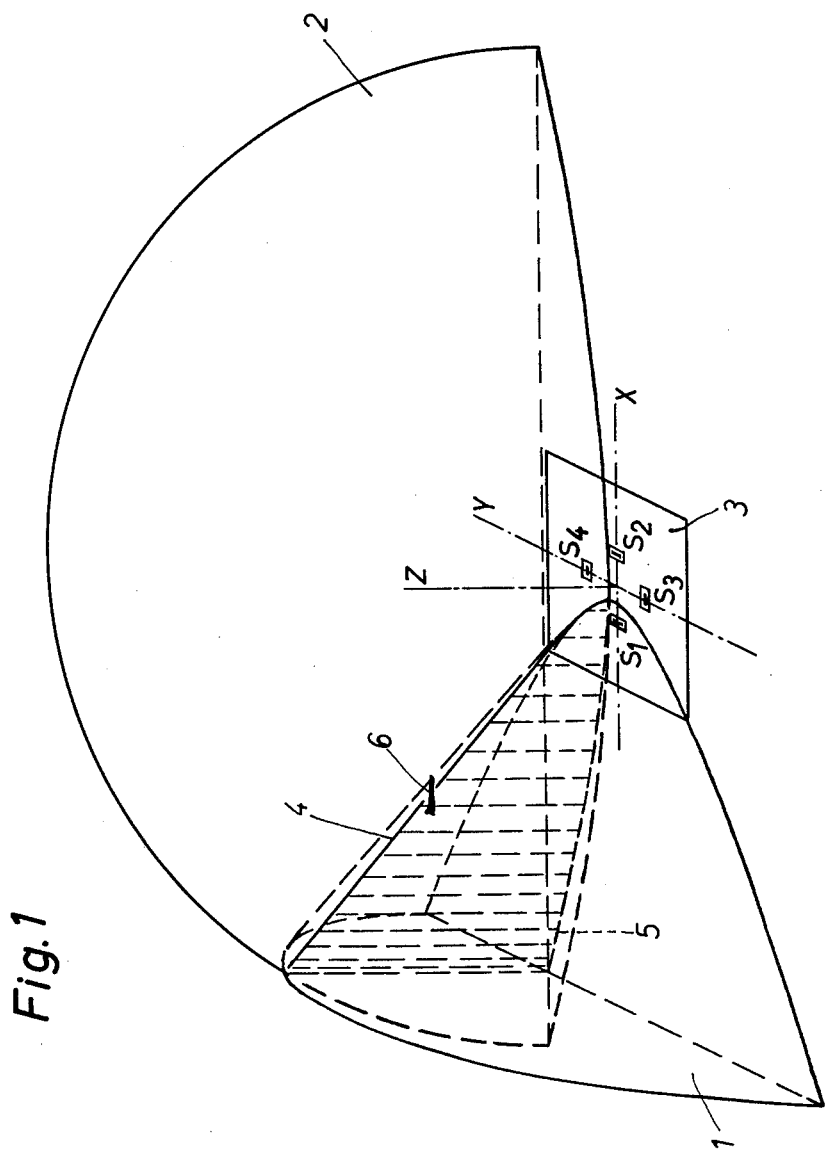
FIGURE 1 is a quantitative perspective representation of a curve of intersection serving as flight path.

FIGURE 1 shows the antennas of two in-phase modulated transmitters $S_1$ and $S_2$ placed at a specific distance within the zone of the landing area. The locus of equal transit-time differences results in hyperbolic surfaces, one of which, i.e., hyperbola lobe 1, is illustrated in FIGURE 1. A second pair of transmitters $S_3$ and $S_4$ are set up under the same conditions as the first two transmitters $S_1$ and $S_2$, but perpendicular thereto, so that an imaginary connection between the four antennas would form a square. A second family of double-lobed hyperbolic surfaces is attained thereby, of which one hyperbola lobe 2 is depicted in FIGURE 1. The double lobed hyperbolic surfaces, formed by the two pairs of antennas, are located vertically to each other and intersect. Each combination of inter-vertices and inter-foci distances (spacing between the antennas) of two double-lobed hyperbolic surfaces, associated perpendicularly with respect to one another, corresponds to four definite curves of intersection. Each curve of intersection has a hyperbolic form in space and passes substantially perpendicularly through the plane containing the landing surface. One curve of intersection 4 which serves as flight path is illustrated in FIGURE 1 quantitatively and perspectively for a case selected at random. The landing area of limited size 3 is intersected by a multitude of such curves of intersection, each of which could be selected as criterion for the approach flight. Depending on the selection of the maxima, the antenna distance being a constant, very steep or very flat curves of intersection can be obtained which will intersect the plane of the landing area at a specific point, and the pilot is thus able to select, and utilize as a guide, a curve which is appropriate for any type of approach.

The relationships will hereinafter be studied analytically.

A family of double-sheet hyperboloids having the x-axis as axis of rotation are governed in the x–y–z-space by the formula:

$$\frac{z^2}{e^2-a_1^2}+\frac{y^2}{e^2-a_1^2}-\frac{x^2}{a_1^2}=-1 \qquad (1)$$

The family of double-sheet hyperboloids having the y-axis as axis of rotation is described by the following formula:

$$\frac{z^2}{e^2-a_2^2} + \frac{x^2}{e^2-a_2^2} - \frac{y^2}{a_2^2} = -1 \qquad (2)$$

where $a_1$ and $a_2$ are the between-vertices distances and $e$ is the linear eccentricity.

By solving Equations 1 and 2 for $x^2$ and $y^2$ we obtain the equations for the curves of intersection:

$$x^2 = \frac{a_1^2-a_2^2-e^2}{a_1^2+a_2^2-e^2} \times \frac{a_1^2(e^2-a_2^2)}{e^2} - \frac{a_1^2}{a_1^2+a_2^2-e^2} \times z^2 \qquad (3)$$

$$y^2 = \frac{a_2^2-a_1^2-e^2}{a_1^2+a_2^2-e^2} \times \frac{a_2^2(e^2-a_1^2)}{e^2} - \frac{a_2^2}{a_1^2+a_2^2-e^2} \times z^2 \qquad (4)$$

These equations, taken together with the corresponding between-vertices distances and with the between-antennae distance ($2e$) give at any desired height $z$, the associated co-ordinates $x$, $y$ of the curve of intersection which are identical with the co-ordinates of the projection 5 of the curves of intersection into the $x$–$y$ (ground co-ordinates).

Figure 2:
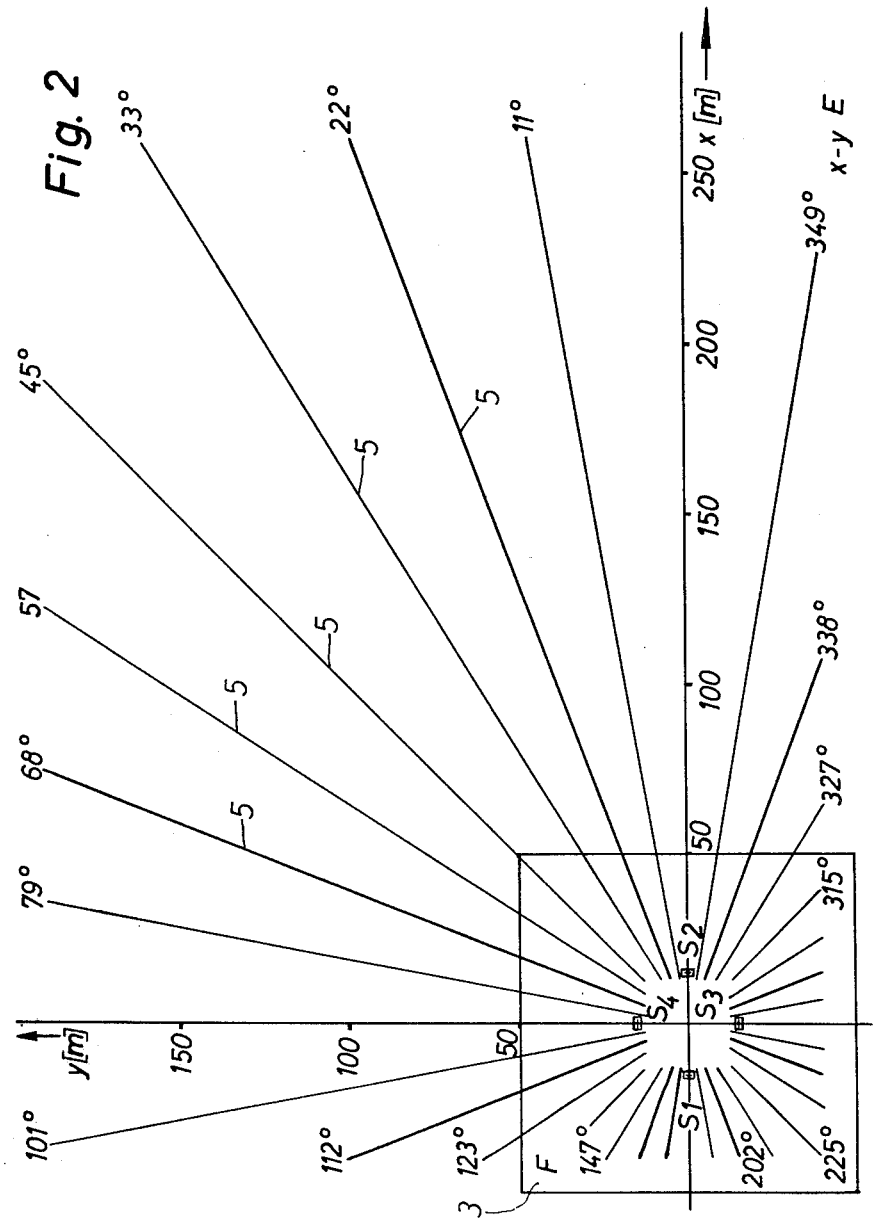
FIGURE 2 represents a vertical projection of several discrete curves of intersection within the landing field plane.

The projections 5 are plotted in FIG. 2 for a number of discrete approach directions. Each projection 5, of the approach along a curve of intersection 4, into the plane of the landing zone is in a first approximation a straight line extending towards the centre of the zone, so that approach from any direction is possible.

Figure 3:
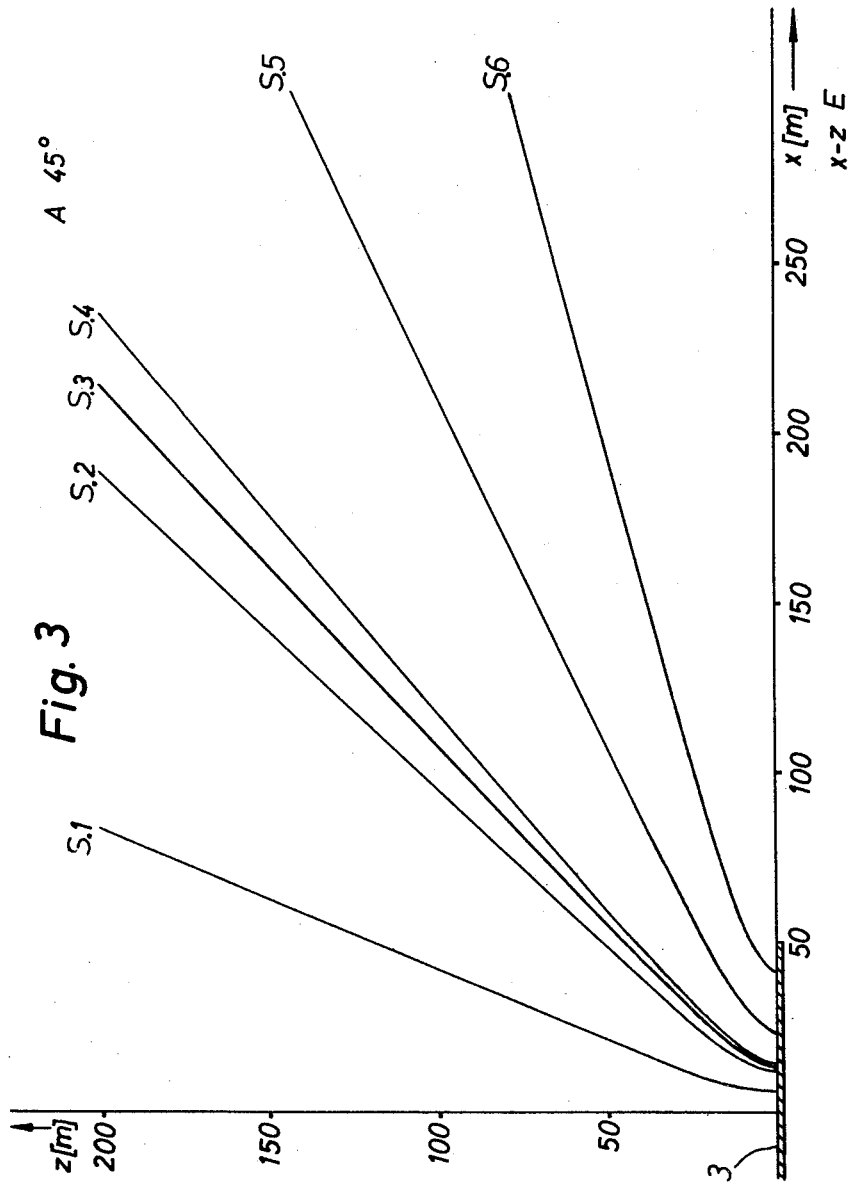
FIGURE 3 illustrates several curves of intersection within the plane of the z-axis which extends in the direction of the azimuth of 45°.

FIGURE 3 shows several curves of intersection —S.1 to S.6— for the azimuth angle of 45° within the plane through the z-axis to illustrate the characteristics of the curves of intersection in space; and the intersection curve will be either steep or flat, depending on the parameters (between-vertices distance of the hyperbola sheets for a constant linear eccentricity). It is therefore possible to select from the multitude of curves of intersection the most suitable curve as the approach criterion for guidance of a VTOL-aircraft to the landing area and the touchdown of a hovering VTOL-aircraft with simultaneous reduction of its kinetic energy.

It is a well known fact that the azimuthal distance of the aircraft from the landing area is of great importance for controlling reduction of the kinetic energy of the VTOL-aircraft. Equations 3 and 4 indicate how this distance can be computed by means available within the aircraft. By use of these equations, it is possible to compute the ground coordinates from the between-vertices distances for any measured altitude $z$. Such distances can be computed by using the results of a transit time measurement, a value which must be measured in any event in the aircraft as a check that the aircraft is flying along a curve of intersection during its landing approach. It is therefore possible with the aid of a small computer to determine with sufficient accuracy, and by means available within the aircraft, the azimuthal distance of the aircraft 6 (see FIGURE 1) from the landing field 3 by computation of the ground coordinates $x$, $y$ and by measurement of the altitude; with this data then being used for the purpose of guiding the aircraft, either manually or by automatic means, to the landing area and to simultaneously control the reduction of its kinetic energy, so as to land the hovering aircraft at the landing area.

Figure 4:
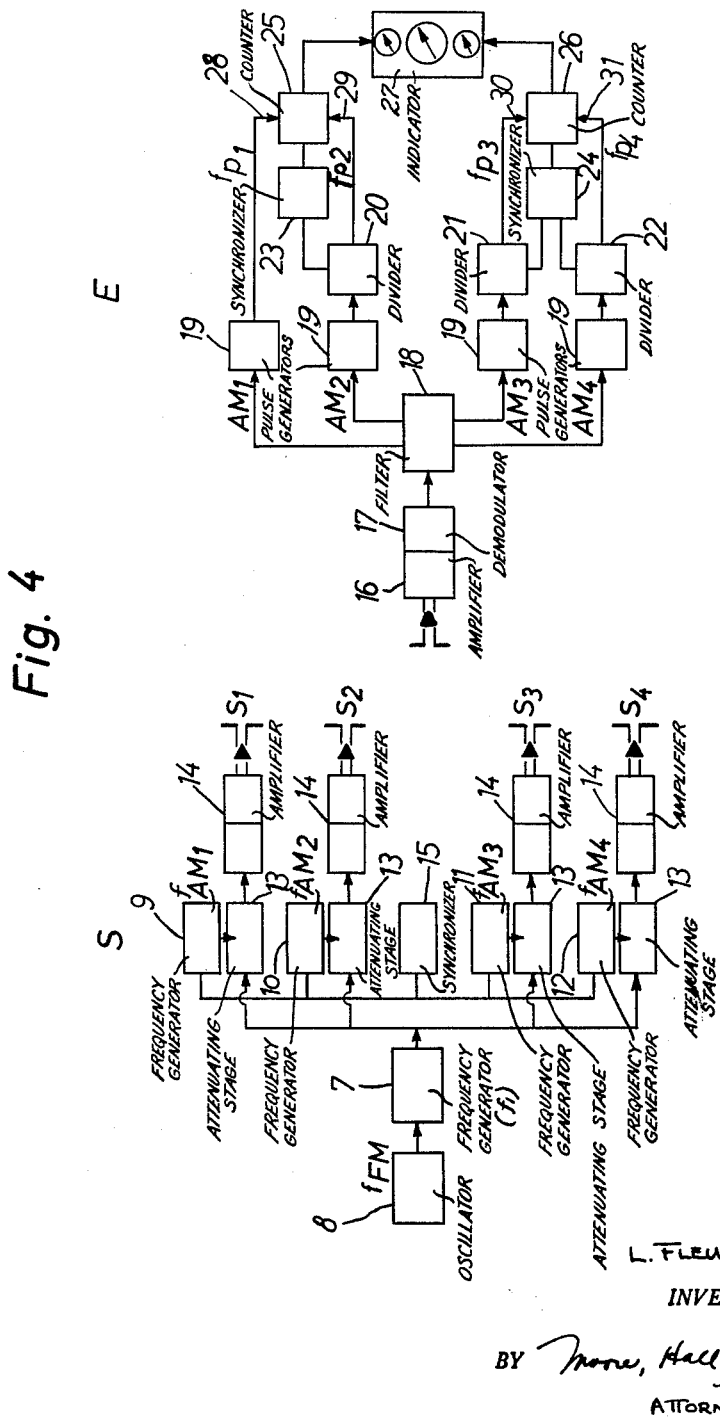
FIGURE 4 is a block diagram illustrating a technical embodiment of a navigational system operating on the principle of three-dimensional hyperbola navigation in accordance with the present invention.

A practical solution of the navigational system proposed by the invention is illustrated by block diagram in FIGURE 4.

For three-dimensional hyperbola navigation used as a landing navigation method for VTOL aircraft, two pairs of transmitters $S_1$, $S_2$ and $S_3$, $S_4$ are used which transmit a frequency- and amplitude-modulated ultra-high frequency carrier. The ground transmitting station is generally designated S in FIGURE 4. The carrier frequency should be in the X-band or higher, in order that the antennae may be small enough to be placed immediately adjacent or actually in the landing surface. Phase difference is measured by the amplitude modulation, the wavelength of which must be greater than the between-antennae distance to ensure a non-ambiguous indication. The very low frequency modulation FM of the carrier is to ensure that interference zones of no reception — i.e., dead zones — in which the oscillations of the cophasally radiating antennae are exactly 180° or 180°+$2\pi x$ out of phase, are shifting all the time. A useful signal can therefore be received when the receiving antenna is near the dead zone. When the antennae are arranged in pairs perpendicular to one another, the geometrical loci of the dead zone are hyperbola sheets in space which shift in time, and in accordance with the modulation frequency, around a central position and therefore prevent any failure of the indicated value. Where antennae longer than $\lambda/2$ are used, the FM can be omitted.

The ground radio station consists — as shown by FIGURE 4 — of a frequency generator 7 producing a carrier frequency $f_1$, which is frequency-modulated by the 30 c./s. frequency output of an oscillator 8. The UHF carrier $f_1$, frequency-modulated by 30 c./s. is then amplitude modulated in the attenuating stages 13 by four different amplitude modulating frequencies $f_{AM1}$ to $f_{AM4}$, generated in stages 9, 10, 11 and 12. The four frequencies have integral ratios with respect to each other and are synchronized by a synchronization stage 15 in such manner that the zero phases of the AM frequency $f_{AM1}$ will coincide with the zero phases of all other AM frequencies. Modulation side bands are suppressed in a filter amplifier 14, and the carrier is amplified to the power required for transmission and radiated from the antennae $S_1$ to $S_4$. Since only one carrier frequency is used, only a single receiver is required at the receiving station, said receiving station being generally designated E in FIGURE 4. The receiver is provided with an antenna E, an input amplifier 16 and a demodulation stage 17, followed by a frequency separating filter 18. The above described apparatus is used to receive, demodulate, and to feed into the frequency separating filter 18 the UHF carrier wave $f_1$ which is modulated by the four diverse AM frequencies $f_{AM1}$ to $f_{AM4}$. At the output of the filter there are then obtained four separate AM frequencies which can be utilized separately. Due to the square arrangement hereinbefore described of the transmitting antennae $S_1$ to $S_4$, the AM frequencies received by the aircraft 6 are in a particular phase relationship to one another which depends upon the position of the aircraft 6. To measure this phase, shift pulse frequencies are derived from the AM frequencies by the pulse generating stages 19 in such manner that a pulse is produced at each passage of the sinusoidal AM frequency through zero. The pulse-generating stages 19 are controlled by the sinusoidal frequency and comprise regenerative circuit arrangements so that very steep pulses can be produced. The pulses derived from the AM frequencies will be staggered in time relatively to one another in accordance with the phase shift of the AM frequencies.

The above mentioned requirement for an integer relationship between the AM frequencies is required in order that four equal pulse frequencies may be produced at the receiving station by means of frequency dividers 20, 21, 22, such pulse frequencies enabling the phase relationship to be measured after the division. The dividers have various dividing ratios: divider 20 a ratio of 2:1, divider 21 a ratio of 3:1, and divider 22 a ratio of 4:1. The dividers 20, 21, 22 suppress one, two or three pulses depending upon their division ratio. The pulse corresponding to the zero phase of the signal $AM_1$ must not be suppressed. Accordingly the equipment is synchronized by two synchronizing stages 23, 24 as follows (see FIGURES 4 and 5):

Reference will first be made to the top branch at the receiving station (see FIG. 4) where the frequencies $f_{p1}$ and $f_{p2}$ appear. A counter 25 starts to count when it receives a first pulse either directly or by way of the divider. If the second pulse arrives within a time which is less than the maximum transit time difference plus a short safety supplement ($t_{s\,max}$ in FIG. 5), the counter 25 is stopped by the second pulse, and is sensed and the count is indicated by the indicator device 27. The counted-out time ($U_{2a1}$) is a direct measure of transit time difference. In this case the divider 20 automatically suppresses the second pulse without a control pulse from the synchronising stage 23. If the counter 25 is started with the pulse of the frequency $f_{p2}$ which coincides with the 180° phase of the frequency $f_{p1}$ ($t_4$ in FIG. 5), no stop pulse would be received by way of the line 28 within the time $t_{s\,max}$. After a short time greater than $t_{s\,max}$, therefore, the counter 25 is stopped by internal means and delivers by way of the synchronising stage 23 a control pulse to the divider 20 which prevents the next pulse from being suppressed. Once this next pulse arrives the upper branch is then synchronised, since both lines 28 and 29 supply a pulse which controls the counter correctly.

A similar procedure occurs in the bottom branch which measures the second hyperbola sheet.

The process of search will take a few milliseconds longer in the lower branch than in the upper branch because a maximum of three pulses ($t_2$, $t_4$, $t_6$) can appear in case of the frequency $f_{p4}$ which do not coincide with the zero phase pulse ($t_1$). During the search which takes place in succession the suppression of the next pulse is always prevented until eventually the counter 26 is stopped over line 30 by the pulse for time interval $t_7$; from this moment on the next two pulses of the frequency $f_{p3}$ and the next three pulses of the frequency $f_{p4}$ are suppressed automatically by the dividers 21, 22. Now the lower branch is also synchronized, and only the pulses corresponding to the zero phase of frequency $f_{p1}$ will reach the counter 26. In synchronized operations the pulse arriving first over line 31 will start the counter 26, and the pulse arriving over line 30 will terminate the counting action (see FIGURE 5). Depending on the position of the aircraft, the pulse of frequency $f_{p3}$ might be in front of frequency $f_{p4}$; this will not effect the counting operation because the counter 26 will be started always by the pulse which arrives first timewise and stopped by the pulse following it.

The indicator device 27 is used for the evaluation of the transit time difference determined by the counters 25, 26. The indicator device is designed in such manner that it will show the transit time difference of the two hyperbola pairs which are arranged vertically with respect to each other ($U_{2a1}$ and $U_{2a2}$) as well as a suitable correlation of the transit time differences ($U_{2a1}$, $U_{2a2}$). The correlation of these two voltages makes it possible to guide the aircraft along a selected curve of intersection (directrix). In case of the installation shown by FIGURE 4, the piloting is performed manually. An automatic control requires a device where a control signal is derived from the transit time difference as determined by the indicator device 27 in order to influence the automatic pilot. Finally, it will be necessary to obtain a criterion for the reduction of the kinetic energy from the correlation of the transit time difference, taking further into consideration the direction of approach and the altitude of the aircraft. This arrangement is shown in FIGURE 6. The output of indicator device 27 (of FIGURE 4) in conjunction with the output of an altimeter 34 can be applied to a computer 33 which is programmed to produce an output signal indicative of the actual distance between the aircraft and the landing point. This control signal can then be used to actuate a further indicator device 35 which can be employed by the pilot, in the manner already described, to effect appropriate reductions in the kinetic energy of the aircraft as the distance to the landing point diminishes.

I claim:

1. A navigational system adapted to guide aircraft, especially VTOL-aircraft, along a directrix to a landing area of very limited size, and to land said aircraft vertically, comprising a ground transmitting station and a receiving apparatus within the aircraft; said ground station comprising four antennas positioned as an array of two pairs of opposed antennas within the region of said landing area, means for radiating over each antenna a modulated electromagnetic high frequency carrier wave in such manner that each pair of opposed antennas produces, in reference to the modulation frequency of said carrier, a family of hyperbolic surfaces of equal transit time differences, with the transverse axes of said hyperbolic surfaces being directed substantially horizontally, said pairs of antennas being positioned in a generally square array whereby said hyperbolic surfaces of equal transit time differences respectively produced by said two pairs of opposed antennas intersect one another to form a plurality of three-dimensional curves of intersection of equal transit time differences passing substantially perpendicularly through the plane containing said landing area, said curves of intersection comprising directrices, and means within said receiving apparatus for selecting and tracking one of said directrices to provide a flight path curve thereby to control and guide the flight of said aircraft along an approach path extending substantially perpendicularly into said landing area.

2. A navigational system adapted to guide a VTOL-aircraft along one of a plurality of directrices extending toward a landing surface of limited size, and further adapted to land the aircraft vertically at said surface, comprising a ground transmission station and a receiving apparatus within the aircraft; said ground station being provided with a plurality of pairs of opposed antennas positioned in an array within the region of said landing surface, means for energizing each of said antennas with a frequency modulated UHF carrier signal having an amplitude modulation impressed thereon, said antennas being so arrayed that each pair of opposed antennas produce, in reference to its amplitude modulation, a family of double-sheet hyperbolic surfaces designated by the parameter of equal transit time differences and having their transverse axes positioned substantially horizontally, said antenna pairs being positioned within the region of said landing surface transversely and at substantially equal distances to one another whereby the hyperbolic sheets of equal transit time differences of two opposed antenna pairs intersect one another to form a plurality of three-dimensional curves of intersection of equal transit time differences, extending radially toward said landing surface and passing substantially vertically into said landing surface, representing directrices adapted to be monitored by said receiving apparatus.

3. The system of claim 2, wherein said antenna pairs are amplitude modulated at different frequencies respectively, said receiving apparatus comprising antenna means adapted to receive said frequency and amplitude modulated UHF carrier signals, means for demodulating said UHF carrier signals, means for measuring the transit time difference of said demodulated, amplitude modulated signals, means coupled to said measuring means for correlating said transit time differences to produce a control signal for controlling the approach flight of said aircraft along a predetermined curve of intersection, means for measuring the altitude of said aircraft, and indicator means responsive to both said altitude and transit time measurements for guiding the reduction of the kinetic energy of said aircraft as said aircraft approaches said landing surface.

4. A navigational system for guiding a VTOL-aircraft to a landing area of limited size and adapted to land the aircraft vertically, comprising a ground station and a receiving apparatus within the aircraft; said ground station comprising four antennas disposed in an array within the region of said landing area, means for energizing said antennas with a low-frequency modulated UHF carrier having an amplitude modulation impressed thereon, the amplitude modulations differing for different ones of said antennas in an integral relationship to one another whereby the signal radiated from each antenna is characterized by its amplitude modulation, said antennas being positioned and energized as pairs of opposed antennas to produce intersecting hyperbolic sheets designated by a parameter of equal transit time differences with the intersections comprising a plurality of three-dimensional curves of equal transit time differences extending radially in all directions to said landing area and passing substantially vertically into said landing area, said receiving apparatus including antenna means for intercepting said frequency and amplitude modulated UHF carrier, means for demodulating said carrier, means responsive to said demodulated amplitude modulated frequencies for measuring transit time differences, and means responsive to said measured transit time differences for generating a control signal for the landing approach of the aircraft along a predetermined curve of intersection.

5. A navigational system for guiding an aircraft to a landing area of limited size and adapted to land the aircraft vertically, comprising ground transmitting means, and a receiving apparatus within the aircraft; said ground transmitting means comprising four antennas disposed as two pairs of opposed antennas in a substantially square array within the region of said landing area, means for energizing each of said antennas with an amplitude and frequency modulated carrier, the amplitude modulations being different for different ones of said antennas in an integral relationship to one another whereby the signals radiated from said antennas are characterized by their amplitude modulations, said antennas being energized in pairs to generate a family of intersecting hyperbolic equal transit time sheets, the intersections of which comprise three-dimensional curves of equal transit time differences extending radially in all directions to said landing area and passing substantially vertically into said landing area, said receiving apparatus including antenna means for intercepting said frequency and amplitude modulated carrier, means for demodulating said carrier frequency, filter means coupled to said demodulating means for separating the amplitude modulation frequencies obtained by said demodulation, means for converting said amplitude modulation frequencies into pulse frequencies, means for variously dividing said pulse frequencies, means responsive to said variously divided pulse frequencies for measuring the transmit time differences of the amplitude modulated frequencies radiated by said opposed antenna pairs, means responsive to said measured transit time differences for producing a control signal for controlling the landing approach of the aircraft along a predetermined curve of intersection, further means for measuring the altitude of said aircraft, and indicator means for guiding the reduction of the kinetic energy of said aircraft in functional relation to said measurements of altitude and transit time differences.

6. The system of claim 5 wherein said means for dividing the pulse frequencies includes synchronizing means for synchronizing said pulse frequencies after their division thereby to bring said pulse frequencies into appropriate phase position for said measurement of transmit time differences.

7. The system of claim 6 wherein said means for measuring transit time difference comprises frequency counter means for counting out and comparing said pulse frequencies.

References Cited by the Examiner

UNITED STATES PATENTS

| | | | |
|---|---|---|---|
| 1,406,996 | 2/22 | Morrill | 343—103 |
| 2,439,663 | 4/48 | Lewis | 343—104 |
| 2,748,385 | 5/56 | Rust et al. | 343—108 |

CHESTER L. JUSTUS, *Primary Examiner.*